United States Patent [19]

Brothers

[11] Patent Number: 5,246,308
[45] Date of Patent: Sep. 21, 1993

[54] FLUID STORAGE SYSTEM AND METHODS OF INSTALLATION

[76] Inventor: Gary S. Brothers, 100 Harrington Rd., Watsonville, Calif. 95076

[21] Appl. No.: 483,210

[22] Filed: Feb. 20, 1990

[51] Int. Cl.⁵ .............................. B65G 5/00; E04H 4/00
[52] U.S. Cl. ................................................. 405/53; 4/499
[58] Field of Search ............................. 405/52–54, 405/131; 52/2 D, 11, 63, 169.7, 2.14; 4/498, 499, 488, 506, 510; 403/373; 256/1, 23

[56] References Cited

U.S. PATENT DOCUMENTS

| | | | |
|---|---|---|---|
| 3,500,593 | 3/1970 | Kwake | 52/2 D |
| 3,701,262 | 10/1972 | Connell et al. | 405/53 X |
| 3,736,754 | 6/1973 | Azalbert et al. | 405/53 |
| 3,769,763 | 11/1973 | Kwake | 52/2 D X |
| 3,810,262 | 5/1974 | Strand | 4/499 |
| 3,903,659 | 9/1975 | Echtler | 52/2 D |
| 3,918,221 | 11/1975 | Benjamin | 4/499 X |
| 3,943,721 | 3/1976 | Azalbert et al. | 405/53 X |
| 4,048,678 | 9/1977 | Chillino | 4/499 |
| 4,385,407 | 5/1983 | Zook | 4/499 |
| 4,457,119 | 7/1984 | Dahowski | 4/498 X |
| 4,471,500 | 9/1984 | Long et al. | 4/499 |
| 4,504,985 | 3/1985 | De Brossard | 4/506 |
| 4,559,746 | 12/1985 | Ishler | 52/63 X |
| 4,592,846 | 6/1986 | Metzger et al. | 405/129 X |
| 4,733,988 | 3/1988 | Kelly | 403/373 |
| 4,786,205 | 11/1988 | Hisken et al. | 405/52 |
| 4,825,479 | 5/1989 | Bonneau | 4/499 |
| 4,953,239 | 9/1990 | Gadsby | 4/499 |

FOREIGN PATENT DOCUMENTS

378190  6/1973  U.S.S.R. .............................. 405/131

Primary Examiner—Dennis L. Taylor
Assistant Examiner—John Ricci
Attorney, Agent, or Firm—Nixon & Vanderhye

[57] ABSTRACT

Disclosed is a fluid reservoir having a bottom and side and end walls which is lined with a flexible material secured about its marginal edges to a footing surrounding the reservoir. A cover is disposed over the reservoir with its marginal edges secured to the footing. A fan supplies air under pressure into the space between the cover and the fluid level to maintain the cover in a raised state above the fluid surface. Webs are provided along the outside of the cover to shape the cover under pressure and to relieve the stresses along the fastening elements used to connect the cover and the footing. The fan operates to supply air under pressure upon sensing a predetermined low pressure in the system, whereas a pressure relief valve opens to vent the air under pressure upon sensing a pressure higher than a predetermined pressure.

17 Claims, 3 Drawing Sheets

FLUID STORAGE SYSTEM AND METHODS OF INSTALLATION

BACKGROUND AND SUMMARY OF THE INVENTION

The present invention relates to a fluid storage system and methods of installing the system. Particularly, the invention relates to covered reservoirs for storing water and methods for installing the water storage facility.

Because of environmental problems, such as water runoff from buildings, greenhouses and the like, there is a current need for environmentally safe facilities for storing fluids, e.g., collecting and storing water. That need includes a facility for storing potable water. There are currently many different types of constructions used for fluid storage systems. For example, concrete, masonry, earth and steel reservoirs, as well as embankment tanks, are frequently used for water storage. Other fluids, such as sewage, various types of chemicals and industrial wastes, and the like may be similarly stored in such constructions. With the general exception of large-scale reservoirs used to store water for supplying communities with potable water, storage facilities of these types are usually on a relatively small scale. For example, a water storage facility may cover only several acres of ground.

In storage facilities of this type, a liner is frequently used to line the sides and bottom of the reservoir. For example, flexible thermoplastic elastomer lining material in sheet form and having a thickness on the order of 45 mil, known in the trade as HYPALON TM, has previously been used for this purpose. It is also customary, and generally necessary in many localities, to provide a cover for the reservoir, e.g., to prevent contamination and evaporation and for safety reasons. The covers for such lined reservoirs have often comprised rigid structures, for example, roofs of reinforced concrete, or other types of relatively rigid building materials. Certain reservoirs, however, have also employed flexible covers, for example, of the same material forming the bottom lining of the reservoir. The use of flexible covers for reservoirs is generally considered a very economical way of covering reservoirs, particularly for those facilities used to store potable water. For example, a flexible cover for a water storage facility precludes contamination of the water with air-borne algae and prevents light necessary to algae growth from reaching the water. Additionally, a cover prevents rodents and other undesirable natural contaminants from entering the stored water.

Those reservoirs having flexible covers, however, have heretofore employed covers which float on the surface of the fluid in the reservoir. The current state of the art in floating covers for reservoirs of this type requires separate floats for maintaining the cover on the surface of the fluid. Additionally, to provide a cover having sufficient material to accommodate the rise and fall of the fluid surface while the cover remains floating on such surface, folds are provided in the cover and weights are applied to the cover to maintain the folds below the fluid surface. While this type of system has been successfully employed, it has certain disadvantages. For example, water runoff from the cover has been a problem and conventionally bilge-type pumps are used to pump the water off the cover. Further, in reservoirs covering acres of land, an individual walking on the floating cover can become trapped within folds of the cover. Such system therefore requires a fence to be placed around the reservoir to warn people away and prevent individuals from being inadvertently trapped within the folds of the cover.

The present invention affords a significant improvement in comparison with such prior fluid storage facilities, especially the type using floating covers, and provides an economical fluid storage system and method of installation which minimize or eliminate the above-noted and other problems with prior fluid storage facilities of this type. Particularly, the present invention provides a fluid storage system having a reservoir with bottom and side and end walls lined with a flexible material and a cover of a flexible material wherein gas under pressure is applied to the space between the fluid level and the cover to maintain the cover in a supported condition spaced above the fluid surface. The cover hereof extends about the reservoir and substantially seals the reservoir from the atmosphere, not only to substantially preclude leakage of air from such pressurized space, but also to prevent contaminants, man-made or of nature, from entering the reservoir. Simultaneously, the predetermined pressurizing system and the pressurized shape of the cover permit natural unassisted runoff of rainwater into a water catchment provided about the periphery of the reservoir. Sufficient rigidity is also afforded the cover to support substantial weight thereon, e.g., individuals walking on the cover.

More particularly, the present invention provides a reservoir having a footing, preferably formed of concrete, about the periphery of the reservoir. The footing mounts a pair of fasteners which extend about the periphery of the reservoir for securing marginal edge portions of both the liner and cover. Each fastener may, for example, comprise a female element secured in the concrete footing for receiving marginal edge portions of the associated cover or liner and a male element received in the female element for securing that marginal edge portion in the female element and to the footing. Consequently, these fasteners, together with the liner and cover, form a substantially air-tight seal about the periphery of the reservoir, although an air-tight seal is not essential.

In accordance with the present invention, a fan is disposed for directing air into and pressurizing the space between the cover and the surface of the fluid in the reservoir. Preferably, the fan is located in the cover. By operating the fan, the air pressure within such space increases sufficiently to displace the cover from and support it above the fluid surface. The cover is maintained in a generally elevated bulbous or dome-like configuration overlying the entirety of the reservoir. Because of the substantially air-tight seal about the periphery of the reservoir and the imperviousness of the cover to transmission of air, fan operation need only be intermittent. Thus, suitable controls are provided the fan for turning the fan on to increase the air pressure within the space below the cover in response to sensing air pressure within the cover below a predetermined air pressure. When the air pressure is raised above a predetermined air pressure, the fan is automatically turned off.

It will be appreciated that the space between the cover and the surface of the fluid is maintained under pressure at all times and sufficiently such that the cover assumes a bulbous or dome-like configuration (dependent upon the plan shape of the reservoir) whereby the cover may support substantial weight, such as the weight of an individual standing on the cover. In accordance with another feature of the present invention, a netting, webbing or other similar flexible structural material is provided over the outside surface of the cover such that, when the cover is under pressure, its shape is maintained by the overlying structural material. For example, where webbing is used, a firs plurality of webs may extend between opposite sides of the reservoir, the web ends being anchored to the footing. A second plurality of webs may similarly be secured to the footing and extend over the cover at right angles to the first plurality of webs. The webs are formed of a material which has a higher tensile strength than the tensile strength of the material forming the cover. Consequently, when the cover is under pressure, it will bear outwardly against the overlying first and second webs whereby the cover is maintained in the predetermined shape, e.g., a bulbous or dome-like shape. This minimizes or eliminates structural loading on the cover and along the fasteners. Substantially the entirety of the structural loading is covered by the overlying material, e.g., the webs. This overlying flexible structural material also assists in maintaining the shape of the cover under high wind loadings which would otherwise distort and possibly even blow out the cover. It will be appreciated that this overlying flexible structural material may take various forms and configurations. For example, high tensile strength fish netting may be used.

This air pressure-sustained shape also directs the flow of rainwater off the cover into a catchment about the periphery of the reservoir. Therefore, in accordance with another feature of the present invention, there is provided a catchment, i.e., a gutter, about the periphery of the reservoir for collecting rainwater runoff from the cover. Where the reservoir is used for water storage, the catchment collects the rainwater runoff from the cover of, flow into the reservoir. Such catchment may take the form of an aluminum gutter secured to the footing about the reservoir or may comprise a shaped concrete catchment or curb in the footing, both of which lie in communication with a drainage system for flowing the rainwater into the reservoir.

An additional feature of the present invention resides in the provision of a pressure relief valve, preferably disposed in the cover. It will be appreciated that the fluid level, e.g., the water level, in the reservoir, rises and falls depending on the quantity of fluid stored. Should the fluid level rise, the pressure in the space between the fluid level surface and the cover will likewise rise. To preclude excessive pressures within such space, the pressure relief valve will open at a predetermined elevated pressure to relieve this excessive pressure.

To construct the fluid storage facility in accordance with the present invention, the liner and cover may be fabricated at a fabrication site removed from the reservoir site. At the reservoir site, both the liner and cover may be disposed in the pre-prepared excavation and secured along their marginal edges. Thereafter, air under pressure may be introduced between the liner and the cover or fluid and air under pressure may be simultaneously introduced whereby the cover will be supported by the contained air within the reservoir.

Where the reservoir is too large for pre-fabrication, the liner and cover material is supplied to the reservoir site in rolls. After the initial excavation and the footings have been constructed, the bottom liner may be rolled out and the edges overlapped for heat-sealing one to the other with an appropriate adhesive. Similarly, the cover may be formed by overlapping the marginal edges of the cover material as the widths of material are unrolled and the edges sealed together. Thus, the overlapping and heat-sealing of the edges may be conducted simultaneously as the cover is pulled from one side of the reservoir across to its opposite side.

Because of the difficulty in dragging a large continuous sheet of rubberized thermoplastic elastomer along an underlying sheet of similar material, there is provided, in accordance with the present invention, a method of installing the cover which overcomes that resistance by enabling the cover to float across the partially or completely filled reservoir. To accomplish this, the rolls of cover material may be overlapped and seamed together, as previously described. However, the leading edge, as well as the side edges of the cover, may be formed into inflatable tubes by folding the cover onto itself. These inflatable tubes may be formed simply by heat-sealing the marginal edges back onto themselves and inflating the space thus formed. These inflated tubes are then disposed in the fluid in the reservoir and the cover may be drawn across the reservoir, with the tubes floating the cover on the surface of the fluid. Upon reaching the opposite side, the tubes may be slit lengthwise, grommets inserted and temporary anchors used to hold the cover in place while the margins of the cover are disposed in the fasteners. By floating the cover across the reservoir, the quantity of material used to form the cover is advantageously reduced in comparison with the quantity of cover material used when the cover is a replication of the liner. That is, the area of the cover may be much less than the area of the liner because the cover need not, for installation, initially conform to the dimensions of the liner.

Accordingly, in a preferred embodiment of the present invention, there is provided a fluid storage system comprising means defining a reservoir for containing a fluid, a cover formed of a flexible, substantially waterproof, material overlying the reservoir and the fluid therein, means disposed about the reservoir for securing the marginal edge portions of the cover about the reservoir, and means for supplying air under pressure between the cover and the surface of the fluid within the reservoir to space and maintain the cover above the fluid surface.

In a further preferred embodiment according to the present invention, there is provided a water storage system comprising means defining a reservoir for containing the water, a cover formed of a flexible, substantially waterproof material for overlying the reservoir and the water therein, a footing formed of a concrete material and disposed substantially about the periphery of the reservoir and means carried by the footing for anchoring marginal edge portions of the cover about the periphery of the reservoir. Means are provided for supplying air under pressure between the cover and the surface of the water in the reservoir to space and maintain the cover above the water surface. Means are also provided overlying the cover and extending between the footings along opposite sides of the reservoir for maintaining the cover in a predetermined shape above the water surface, together with means carried by the footings for anchoring the maintaining means adjacent the opposite sides of the reservoir, the maintaining means being formed of a material having a tensile strength greater than the tensile strength of the flexible cover such that the cover bears against the maintaining means in response to the air pressure against its undersurface whereby the maintaining means maintains the cover in a predetermined shape.

In a still further preferred embodiment according to the present invention, there is provided a method of installing a cover for a fluid storage facility having a reservoir for containing a fluid, including the steps of floating the cover on the fluid in the reservoir from one side of the reservoir to its opposite side such that the cover extends between the opposite sides of the reservoir and supplying air under pressure between the cover and the surface of the fluid to space and maintain the cover above the fluid surface.

Accordingly, it is a primary object of the present invention to provide a novel and improved economical fluid storage facility and methods of construction or installation thereof having various advantages in construction, mode of operation and use, including the capacity to automatically collect rainwater runoff and support substantial weight on the cover, as well as maintain the facility substantially sealed.

These and further objects and advantages of the present invention will become more apparent upon reference to the following specification, appended claims and drawings.

DETAILED DESCRIPTION OF THE DRAWING FIGURES

Reference will now be made in detail to the present preferred embodiment of the invention, an example of which is illustrated in the accompanying drawings.

Figure 1:
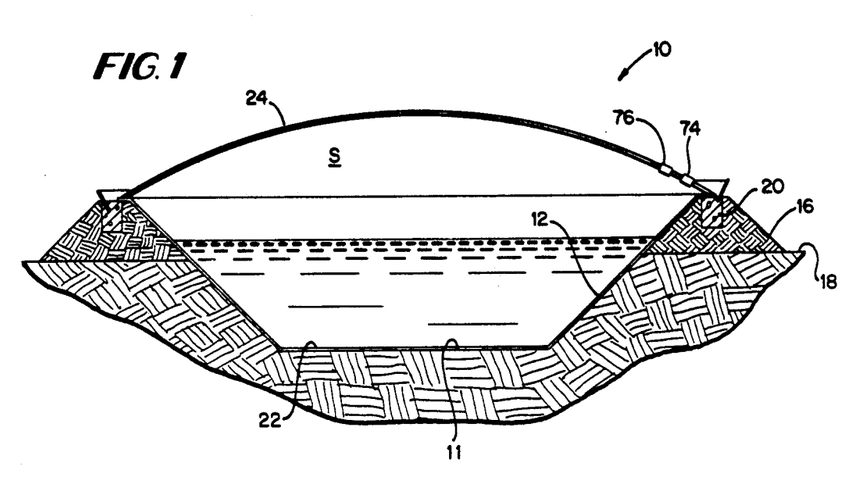
FIG. 1 is a cross-sectional view of a fluid storage facility or reservoir constructed in accordance with the present invention.
Figure 3:
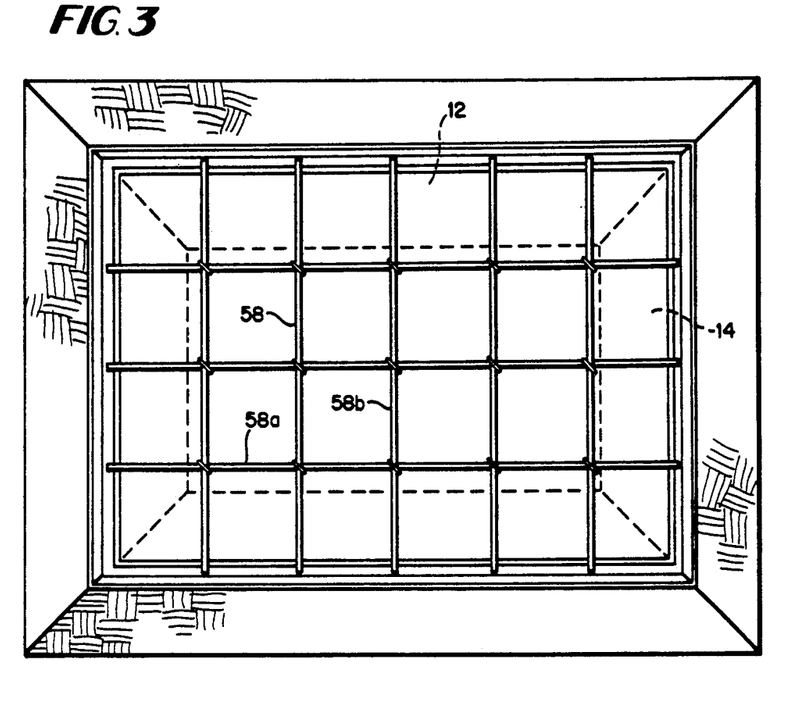
FIG. 3 is an enlarged top plan View of the reservoir illustrated in FIG. 1.

Referring now to the drawings, particularly to FIG. 1, there is illustrated a reservoir, generally designated 10, constructed in accordance with the present invention. Reservoir 10 may comprise an excavation lined with concrete, masonry, steel or earth to define a fluid containment system. It will be appreciated that the cover of the present invention, as described in detail hereinafter, may be used with reservoirs of any type an need not necessarily be used with a reservoir of the type described and illustrated herein or with a reservoir having a liner. By way of example, reservoir 10 is provided with a bottom 11 and inclined side and end walls 12 and 14, respectively. Side and end walls 12 and 14 may comprise, in part, a fill bank 16 formed from excavated material and which bank 16 has been compacted and shaped as desired such that the elevation of the reservoir extends above ground level, denoted 18 in FIG. 1. In this preferred embodiment of reservoir 10, a footing 20, preferably formed of concrete, is provided in the fill bank about the entire periphery of the reservoir. It will be appreciated that the shape of the reservoir is not critical to the present invention and that the present invention may be used in fluid storage facilities of any peripheral shape, e.g., rectangular, square, circular or other shapes, including free forms. However, most reservoirs will be constructed in a generally rectangular shape and the description herein is provided, by way of example, with reference to such rectangularly-shaped reservoir. Thus, footing 20 is provided about the long and short sides of the rectangular reservoir substantially about the entirety of its periphery, as illustrated in FIG. 3.

The bottom, side and end walls of the reservoir may be lined with a substantially waterproof flexible membrane 22. This membrane may comprise any suitable material and may be formed from the same or different material used to form cover 24. For example, a material sold under the tradename HYPALON may be used. This material is a rubberized, thermoplastic elastomer lining material manufactured by the Burke Rubber Company, San Jose, California. It is formed from a single ply of reinforcing fabric totally encapsulated within two plies of synthetic rubber, giving a three-ply construction having various nominal thicknesses, for example, 45 mils. The material may be tailored for various uses, for example, for storage of potable water. The material is substantially waterproof, has a very low water vapor transmission rate, has been previously successfully used as a lining material for reservoirs, and is commercially provided in rolls of selected widths. Typically, when laying the material in the reservoir, the adjoining side edges of the material are overlapped and heat-sealed together to form a substantially waterproof membrane.

The material of the cover 24 may constitute the same material as the liner, as previously described, or another suitable flexible material having similar characteristics of substantial strength and impermeability to water vapor transmission. The cover material 24 is likewise provided in rolls of selected width and, when fabricated into the cover, the edges of the material may be overlapped and heat-sealed one to the other. As indicated, the HYPALON TM material has previously been used as a floating cover material for fluid storage facilities.

Figure 2:
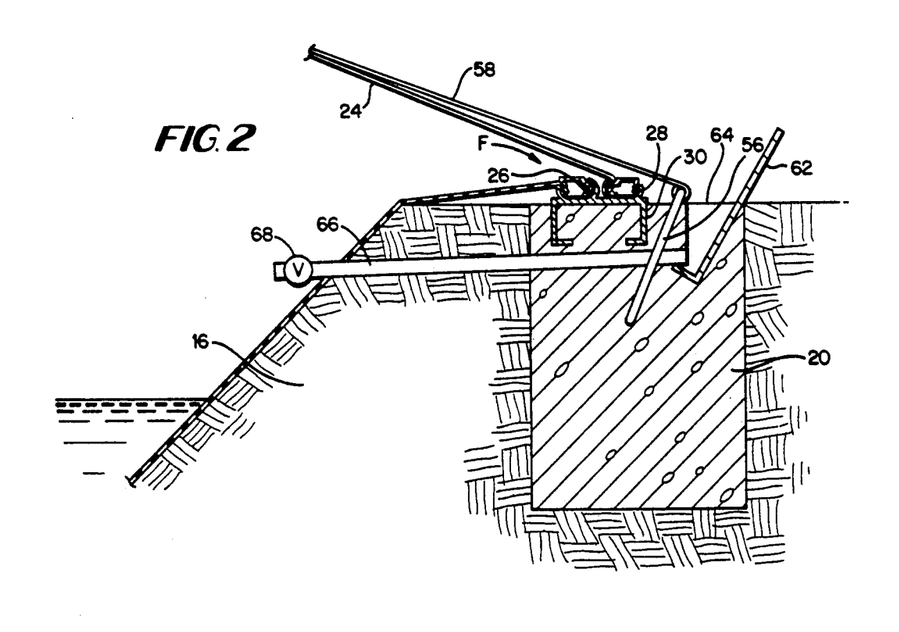
FIG. 2 is an enlarged cross-sectional view of one side of the reservoir illustrating the footings, drainage system and fasteners for the liner and cover.
Figure 4:
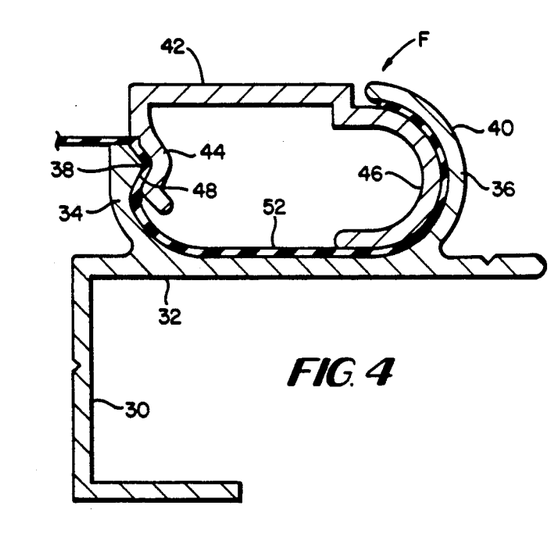
FIG. 4 is an enlarged cross-sectional view illustrating a typical fastener used to connect the liner and cover to the footing.

Referring now to FIGS. 2 and 4, the manner of fastening the marginal edge portions of both the bottom liner and cover, 22 and 24, respectively, to the margin of the reservoir and particularly to the concrete footings 20 will now be described. Fasteners F are preferably provided along the top of footings 20 and extend substantially continuously about the periphery of the reservoir. For example, fastener 26 is provided for securing the marginal edge portions of the bottom liner 22 to footing 20, while fastener 28 is provided for securing the marginal edge portions of the cover to footing 20. The fasteners 26 and 28 each comprise female and male elements, the female elements of which may be integrally formed as part of an extrusion, which also carries depending flanges 30 for securement in footing 20.

In FIG. 4, there is disclosed in cross-section an enlarged view of the fastener, which may comprise either one of fasteners 26 and 28, it being appreciated that a description of one is a description of the other. In FIG. 4, fastener 26 includes a base portion 32 and a depending leg 30. Projecting upwardly from base 32 are the sides 34 and 36 of the female fastening element. Side 34 comprises an upstanding flange having a projection 38 which extends inwardly toward opposite side 36. Side 36 constitutes a semi-circular section 40, the sides 34 and 36 being connected by base 32.

The male element, designated 42, includes sides 44 and 46, which are received within the female element. Sides 44 and 46 are shaped correspondingly to sides 34 and 36, respectively, of the female element. Particularly, side 44 of male element 42 includes an inwardly directed recess 48 for receiving projection 38 of side 34, while the opposite side 46 has a semi-circular section corresponding to and fitting within side 36. The base of male element 42 connects between the opposite sides 44 and 46.

To secure the liner or cover to the corresponding fastener, the marginal edge portion 52 of the liner or cover, as applicable, is received within the female portion of the fastener along its inside surfaces. The male element 42 is then press-fitted into the female element, maintaining the marginal edge portions 52 of the cover or liner between the male and female elements. This securement forms essentially an air-tight seal.

Figure 5:
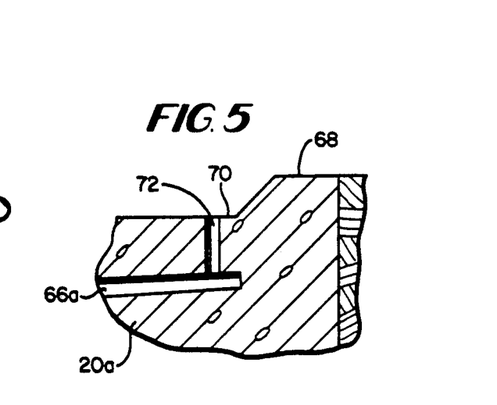
FIG. 5 is an enlarged fragmentary cross-sectional view of another embodiment of the catchment system for containing water runoff from the cover of the reservoir.
Figure 6:
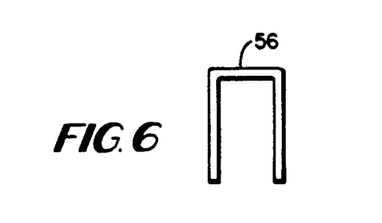
FIG. 6 is an elevational view of the anchors for the webs overlying the cover.

Also, as illustrated in FIGS. 2 and 5, a plurality of anchoring elements 56 are disposed at longitudinally spaced positions about the periphery of the reservoir. The elements 56 may be U-shaped, as illustrated in FIG. 6, with the legs thereof embedded into the concrete. Anchors 56 anchor flexible structural material which overlies cover 24, carries the structural loading on the cover and maintains it in a predetermined shape. The material may comprise an interlacing of webbing, a fishnet-type structure or other similar structure. In the preferred embodiment, webs 58 are employed for this purpose. Thus, webs 58 overlie cover 24 and their opposite ends are anchored to anchors 56 at opposite sides of the reservoir 10. Webs 58 are formed of a material having a greater tensile strength than the tensile strength of the material forming the cover 24, for reasons which will become apparent from the ensuing description. The ends of the webs extend about the base portions of anchors 56 and conventional webbing buckles, not shown, may be used to secure the webs to anchors 56.

In the illustrated rectangular form of reservoir 10, it will be appreciated that webs 58a extend between the short opposite sides of the rectangular reservoir while the webs 58b extend between the long opposite sides of the reservoir. Each of these first and second webs, therefore, extend at right angles one to the other and intersect one another to form a grid overlying cover 24. The webs are dimensioned to provide a predetermined shape to the cover when the cover is displaced upwardly under pressure. For example, the webs may be dimensioned to provide cover 24 with an essentially elongated dome-shaped configuration for covering a rectangular reservoir.

Figures 7, 8:
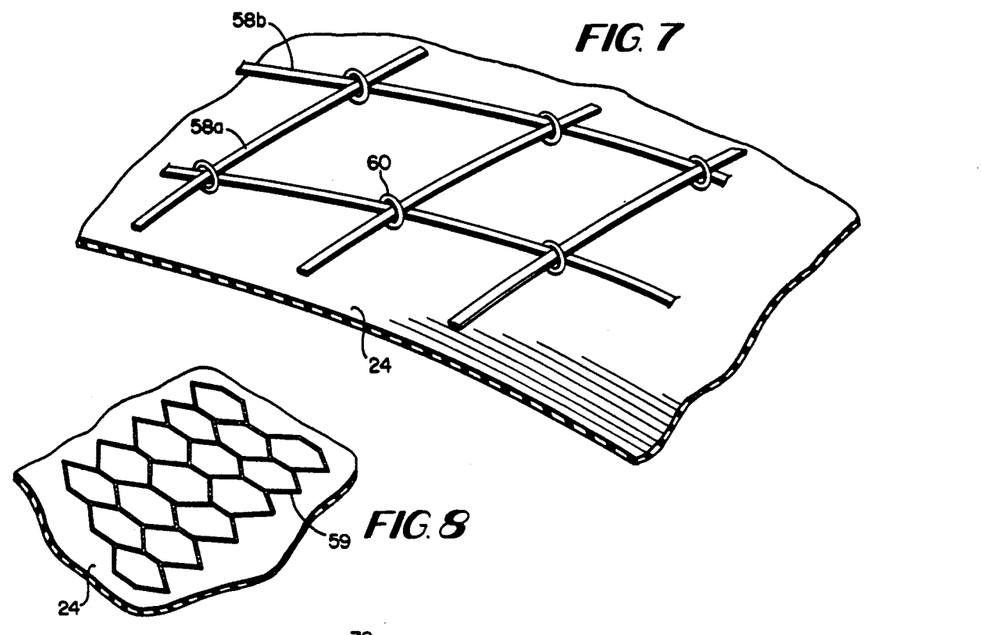
FIG. 7 is a fragmentary enlarged perspective overlying the cover.
FIG. 8 is a view similar to FIG. 7 illustrating a further form of the structural support system for the cover.

Referring to FIG. 7, first and second webs 58a and 58b are preferably connected one to the other at their intersections. For example, loops 60 are provided whereby the webs are restrained from significant longitudinal or lateral displacement from the desired grid-like configuration establishing the shape of the cover when the reservoir is pressurized. The loops 60 need not be provided at each intersection of webs 58a and 58b and may or may not be secured to cover 24, as desired.

Referring now to FIG. 8, there is illustrated another form of webbing system for carrying the loading imposed on the cover by the pressurized air between the cover and the fluid surface. In this form, there is provided, instead of discrete webs, a high tensile strength fish netting 59, overlying cover 24. The marginal edges of the fish netting are, of course, secured, preferably to the footing 20, about the periphery of the reservoir. Thus, the upward pressure exerted by the cover on the fish netting will be resisted by the fish netting and its securement to the footing, relieving the cover of any substantial stresses.

While an overlay of structural material has been described, it will be appreciated that such structural overlying material is not absolutely essential depending upon the strength characteristics of the liner and the size of the reservoir. For example, for small reservoirs, a structural overlay may not be necessary and the liner itself may comprise the structural material.

Referring now to FIG. 2, a rainwater catchment is provided about the periphery of reservoir 10. In the embodiment illustrated in FIG. 2, an extruded, preferably aluminum, gutter 62 may be recessed and embedded in footing 20 and extends about the periphery of the reservoir. Consequently, it will be appreciated that rainwater runoff from cover 24 will collect in gutter 64. At spaced intervals along footing 20, there is provided piping 66 for communicating the water in gutter 64 into the reservoir 10. A valve 68 may be provided in the piping 66 as necessary.

Instead of a gutter 62, the concrete of footing 20 may be shaped to provide the gutter. For example, as illustrated in FIG. 5, a curb 68 is provided on footing 20a to define a trough about the periphery of the reservoir. The trough 70 lies in communication with piping 66a through a suitable conduit 72. It will be appreciated that where the reservoir is filled with a fluid other than water, the gutter system may collect rainwater runoff and pipe it to another storage system rather than into the fluid reservoir.

In accordance with the present invention, a fan 74 is provided for supplying air under pressure into the space between cover 24 and the surface of the fluid in reservoir 10. Preferably, fan 74 is located in cover 24 per se. A pressure sensor may also be provided in conjunction with the fan for sensing the pressure in space S between cover 24 and the surface of the fluid and controlling the on-off operation of fan 74, as explained hereinafter. In the on-off condition, the fan seals the fan opening to preclude outflow of air. Additionally, a pressure relief valve 76 may be provided, likewise in cover 24. In response to sensing a predetermined pressure in space S, relief valve 76 will open to vent such space S. Both the fan, the controls therefor, and the pressure relief valve are conventional per se and further description of those elements is not believed necessary.

It will be appreciated that concrete footings are not absolutely necessary to the present invention, although they are preferred. For example, an earth footing may be provided by a conventional trenching operation. That is, the fill bank 16 may be provided with a trench which receives the marginal edge portions of the liner and cover. Anchors may be used in the trenching system to afford additional securement for the webbing system. Upon back-filling the trench, and supplying air under pressure between the cover and the fluid surface or the liner, a storage facility, similarly as previously described, may be provided.

In use, the liner and cover are fabricated to the required dimensions, either off-site or on-site, and both may be laid in the previously prepared reservoir. The marginal edge portions of bottom liner 22 are then attached to fasteners 26 and likewise the marginal edge portions of cover 24 are attached to the fasteners 28. Fan 74 is then actuated and air under pressure is pumped into the space between the cover and liner. Alternatively, reservoir 10 may be filled or partially filled with fluid prior to supplying air under pressure between the cover and the fluid surface. Air pressure between the surface of the fluid and the interior surface of the cover then causes the cover to be displaced outwardly and upwardly against webs 58. Upon reaching a predetermined pressure, for example, between 2–5 p.s.i., the pressure below cover 24 is sensed and the fan is automatically turned off. Because the space S is substantially air-tight, air leakage from the reservoir is at a minimum and, consequently, the fan is not continuously operated. Rather, it is operated only intermittently. When the air pressure sensed in space S obtains a predetermined low value, for example, 2 p.s.i., the fan is actuated by the sensor and the air pressure is returned to the predetermined higher air pressure, e.g., 3 or 4 p.s.i., at which time such pressure is sensed and the fan is turned off.

It will be appreciated that the fluid level in the reservoir will vary. For example, fluid may be withdrawn from the reservoir for use or, in the case of a water storage facility, rainwater may flow into the reservoir. Thus, when the level of fluid in the reservoir decreases through usage, the air pressure between the cover and fluid surface will be reduced. At predetermined reduced air pressure, e.g., 2 p.s.i., the fan will automatically be turned on to restore the air pressure below cover 24 to a predetermined operating value. Conversely, when the fluid level rises in the reservoir, the pressure between the cover and fluid surface will increase. At a predetermined elevated pressure, for example, 6 p.s.i., the fluid pressure relief valve 76 will open automatically and relieve the pressure within the reservoir by venting air therefrom.

Figure 9:
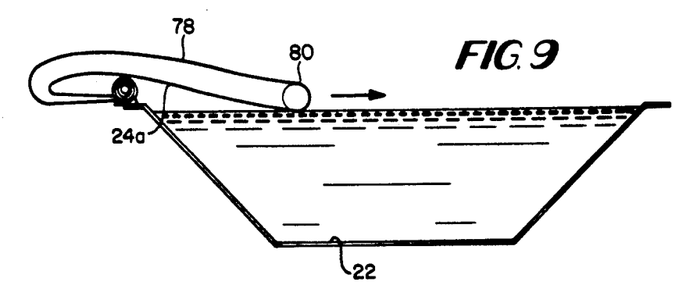
FIGS. 9 and 10 are schematic illustrations of a method of installing a cover.
Figures 10, 11:
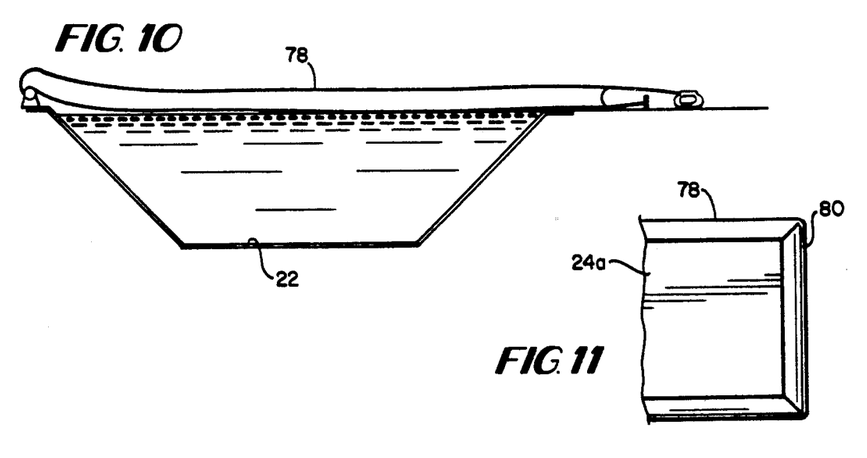
FIG. 11 is a fragmentary plan view of the cover illustrated in FIGS. 9 and 10.

In a further form of the present invention, and with reference to FIGS. 9–11, it will be appreciated that, particularly with respect to large-scale reservoirs, it is difficult to draw the cover across the reservoir from one side to the opposite side because of the weight of the cover material and its frictional engagement with the liner. Therefore, in accordance with the present invention, the liner may be secured to the fasteners along one side of the reservoir. The sides and opposite end edge of the liner may be folded over to form substantially air-tight side and end inflatable tubes, 78 and 80, respectively. For example, the tubes may be formed by folding over the edges of the cover 24a onto themselves and heat-sealing or otherwise securing those edges to the body of cover 24a. Inflating devices may be formed in the tubes so that the tubes may be inflated at the installation site. By filling or partially filling the reservoir after the bottom liner 22 has been installed, the cover 24a, with the inflatable tubes formed along its sides and leading edge, may be floated across the reservoir. By drawing the cover across the partially or completely filled fluid reservoir, the tubes 78 and 80 support the cover on the fluid, thus eliminating frictional resistance otherwise occurring between the cover and the liner. Once the leading edge of the cover has reached the opposite side of the reservoir, the tubes may be slit lengthwise and grommets inserted into one of the leaves of the slit tubing to temporarily hold the cover in place. The other leaf of the split tubing may then be secured, for example, by using the fasteners F.

It will be appreciated that, with the foregoing method, the quantity of cover material may be reduced in comparison with the quantity of liner material necessary to line the reservoir. That is, if the cover is drawn across the reservoir without fluid in the reservoir, it naturally assumes the shape of the liner. This requires a substantial quantity of material to follow the configuration of the liner. By floating the cover across, that excess material can be eliminated. Thus, a relatively shallow dome or bulbous configuration of the cover may be obtained in comparison to the relatively deep configuration of the liner relative to the footings.

It will be appreciated that with the foregoing system, there is no need for fencing about the reservoir because the cover covers the entirety of the reservoir, when the system is properly operating, the cover will be supported sufficiently to carry the weight of an individual. Also, and particularly in the case of a storage system for potable water, the cover is preferably formed of a non-light-transmitting colored liner. For other fluids to be stored, any color of liner, including a clear liner, may be employed. Thus, algae, for example, will not form or grow in the water. The present system of the present invention is also much more economical to construct than systems using fixed roofing structures.

Additionally, to prevent collapse of the liner, particularly where access to the interior of the liner and reservoir is required, a double-door entry system may be provided to prevent air pressure leakage. For example, a type of airlock may be used having a double entry into a compartment between the liner interior and its exterior. Zippered lining material may be used as the double doors at opposite ends of the compartment. Thus, for ingress and egress, one zippered liner is opened for entry into the compartment while the other liner remains closed. After passing through the liner, it is zippered closed before the other zippered liner is opened. Thus, air pressure within the reservoir is substantially maintained while affording access thereto.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A large-scale fluid storage system comprising:
means defining a reservoir for containing a fluid and including a liner along the bottom of said reservoir for underlying the fluid, said liner being formed of a flexible, substantially waterproof material and means disposed about said reservoir for securing the marginal edge portions of said bottom liner about said reservoir, peripheral portions of said liner lying above the fluid level in said reservoir;

cover formed of a flexible, substantially waterproof, material overlying said reservoir, the fluid therein, and said liner;

mean disposed about said reservoir for securing the marginal edge portions of said cover about said reservoir;

the marginal edge portions for each of said cover and said bottom liner lying closely adjacent one another about substantially the entire periphery of the reservoir;

said cover, said peripheral portions of said liner and the surface of the fluid within the reservoir defining a substantially wholly encapsulated volume between said cover and the surface of the fluid within the reservoir with the surface of the fluid in contact with said volume;

means for supplying air under pressure into the volume between said cover and the surface of the fluid within said reservoir to space and maintain said cover above the fluid surface whereby said cover is structurally loaded by the air under pressure, said cover substantially sealing said volume from the atmosphere to substantially preclude leakage of air from said pressurized volume and having sufficient strength and rigidity when spaced above the fluid surface to support the weight of an individual walking on the cover;

a pressure relief valve for enabling egress of air from said space between said cover and the fluid surface in response to air pressure in said space in excess of a predetermined air pressure;

means (i) overlying said cover, (ii) anchored about the periphery of said reservoir, and (iii) unconnected to portions of said cover overlying said volume for maintaining said cover in a predetermined shape and for receiving the structural loading applied to said cover by the air pressure whereby substantially the entirety of the structural loading on said cover is transferred to said maintaining means thereby substantially minimizing the structural loading on said cover, said maintaining means being formed of a material having a tensile strength greater than the tensile strength of said flexible cover for carrying the structural loading transferred thereto by said cover.

2. A system according to claim 1 wherein said maintaining means overlying said cover includes a first plurality of webs spaced one from the other and extending between opposite sides of said reservoir, means for anchoring said webs adjacent said opposite sides of said reservoir, said webs being unconnected to said cover to enable relative movement therebetween and overlying said cover such that said cover bears against said webs in response to the air pressure against the undersurface of said cover whereby said webs maintain said cover in a predetermined shape.

3. A system according to claim 2 including a second plurality of webs spaced one from the other and extending between a second pair of opposite sides of said reservoir, means for anchoring said second webs adjacent said second pair of opposite sides of said reservoir, said second webs being formed of a material having a tensile strength greater than the tensile strength of said flexible cover, said second webs being unconnected to said cover to enable relative movement therebetween and overlying said cover such that said cover bears against said first and second webs in response to the air pressure against the undersurface of said cover whereby said first and second webs maintain said cover in a predetermined shape.

4. A system according to claim 3 wherein said first and second webs intersect one another and means for connecting at least two of said intersecting webs one to the other.

5. A system according to claim 1 wherein said maintaining means overlying said cover includes a first plurality of webs spaced one from the other and extending between a pair of opposite sides of said reservoir and, means for anchoring said webs adjacent said opposite sides of said reservoir.

6. A system according to claim 1 wherein said air supplying means includes a fan for supplying air into said space.

7. A system according to claim 1 including a pressure relief valve for enabling egress of air from said space between said cover and the fluid surface in response to air pressure in said space in excess of a predetermined air pressure.

8. A system according to claim 1 wherein said securing means includes a female element having shaped sides and a bottom and extending substantially about the periphery of said reservoir for receiving the marginal edge portions of said cover, and a male element having generally shaped sides corresponding generally to the shaped sides of said female element and a portion interconnecting said shaped sides thereof, said male element being received in said female element with the marginal edge portions of said cover disposed therebetween, and means for securing said male and female elements one to the other.

9. A system according to claim 8 wherein said securing means for said male and female elements includes means cooperable therebetween and defining a snap fit.

10. A water storage system comprising:

means defining a reservoir for containing the water and including a liner along the bottom of said reservoir for underlying the water, said liner being formed of a flexible, substantially waterproof material and means disposed about said reservoir for securing the marginal edge portions of said bottom liner about said reservoir, peripheral portions of said liner lying above the surface of water in the reservoir defining means;

a cover formed of a flexible, substantially waterproof material for overlying said reservoir and the water therein, said cover, said peripheral portions and the surface of water within the reservoir defining a substantially wholly encapsulated volume between said cover and the surface of the water with the surface of the water in contact with the volume;

a footing formed of a concrete material disposed substantially about the periphery of said reservoir;

means carried by said footing for anchoring and substantially sealing marginal edge portions of said cover about the periphery of said reservoir thereby substantially sealing said volume from the atmosphere to substantially preclude leakage of air from said volume;

means for supplying air under pressure in said volume between said cover and the surface of the water in the reservoir to space and maintain said cover above the water surface whereby said cover is structurally loaded by the air under pressure, said air supply means including a fan for selectively supplying air into said volume and means for preventing backflow of air through said fan from said space to the atmosphere to maintain said volume substantially sealed when said fan is not supplying air into said volume, and a pressure relief valve for enabling egress of air from said volume between said cover and the fluid surface in response to air pressure in said volume in excess of a predetermined air pressure, said cover having sufficient strength and rigidity when spaced above the fluid surface to support the weight of an individual walking on the cover;

means (i) overlying said cover, (ii) extending between the footings along opposite sides of said reservoir, and (iii) unconnected to portions of said cover overlying said volume for maintaining said cover in a predetermined shape above the water surface and for receiving the structural loading applied to said cover by the air pressure whereby substantially the entirety of the structural loading on said cover is transferred to said maintaining means thereby substantially minimizing the structural loading on said cover, said maintaining means being formed of a material having a tensile strength greater than the tensile strength of said flexible cover such that said cover bears outwardly against said maintaining means in response to the air pressure against the undersurface of said cover whereby said maintaining means carries the loading transferred thereto by said cover; and means carried by said footings for anchoring said maintaining means adjacent said opposite sides of said reservoir.

11. A system according to claim 10, including means disposed in said footing for anchoring marginal edge portions of said liner about the periphery of said reservoir.

12. A system according to claim 11 wherein said cover anchoring means and said liner anchoring means each includes a female element having shaped sides and a bottom and extending substantially about the periphery of said reservoir for receiving marginal edge portions of the associated cover or liner, and a male element having generally shaped sides corresponding generally to the shaped sides of said female element and a portion interconnecting said shaped sides, said male element being received in said female element with the marginal portions of the corresponding cover or liner disposed therebetween and mean for securing said male and female elements one to the other.

13. A system according to claim 10 wherein said reservoir defining means includes a fill bank above ground level, said footings being disposed in said fill bank whereby said footings, fill bank, and cover are disposed above ground level.

14. A water storage system comprising:
means defining a reservoir for containing the water and having peripheral portions lying above the surface of water in the reservoir defining means;
a cover formed of a flexible, substantially waterproof material for overlying said reservoir and the water therein, said cover, said peripheral portions and the surface of water within the reservoir defining a substantially wholly encapsulated volume between said cover and the surface of the water with the surface of the water in contact with the volume;
a footing formed of a concrete material disposed substantially about the periphery of aid reservoir;
means carried by said footing for anchoring and substantially sealing marginal edge portions of said cover about the periphery of said reservoir thereby substantially sealing said volume from the atmosphere to substantially preclude leakage of air from said volume;
means for supplying air under pressure in said volume between said cover and the surface of the water in the reservoir to space and maintain said cover above the water surface, said air supply means including a fan for selectively supplying air into said volume and means for preventing backflow of air through said fan from said space to the atmosphere to maintain said volume substantially sealed when said fan is not supplying air into said volume, and a pressure relief valve for enabling egress of air from said volume between said cover and the fluid surface in response to air pressure in said volume in excess of a predetermined air pressure, said cover having sufficient strength and rigidity when spaced above the fluid surface to support the weight of an individual walking on the cover;
means overlying said cover and extending between the footings also opposite sides of said reservoir for maintaining said cover in a predetermined shape above the water surface; and
means carried by said footings for anchoring said maintaining means adjacent said opposite sides of said reservoir, said maintaining means being formed of a material having a tensile strength greater than the tensile strength of said flexible cover such that said cover bears against said maintaining means in response to the air pressure against the undersurface of said cover whereby said maintaining means maintains said cover in a predetermined shape, said reservoir containing water, water catchment means disposed about said reservoir for catching water runoff from said cover and means for communicating the runoff water from said catchment means into said reservoir.

15. A method of installing a cover for a fluid storage facility having a reservoir for containing a fluid, including the steps of:
floating the cover on the fluid in the reservoir from one side of the reservoir to its opposite side such that the cover extends between the opposite sides of the reservoir; and
supplying air under pressure between the cover and the surface of the fluid to space and maintain the cover above the fluid surface.

16. A fluid storage system comprising:
means defining a reservoir for containing a fluid;
a cover formed of a flexible, substantially waterproof, material overlying said reservoir and the fluid therein;
means disposed about said reservoir for securing the marginal edge portions of said cover about said reservoir;
means for supplying air under pressure between said cover and the surface of the fluid within said reservoir to space and maintain said cover above the fluid surface;
means overlying said cover and anchored about the periphery of said reservoir for maintaining said cover in a predetermined shape substantially without loading said cover;
said overlying means including a first plurality of webs spaced one from the other and extending between a pair of opposite sides of said reservoir, means for anchoring said webs adjacent said opposite sides of said reservoir, said webs being formed of a material having a tensile strength greater than the tensile strength of said flexible cover and overlying said cover such that said cover bears against said webs in response to the air pressure against the undersurface of said cover whereby said webs maintain said cover in a predetermined shape;

a second plurality of webs spaced one from the other and extending between a second pair of opposite sides of said reservoir, means for anchoring said second webs adjacent said second pair of opposite sides of said reservoir, said second webs being formed of a material having a tensile strength greater than the tensile strength of said flexible cover and overlying said cover such that said cover bears against said first and second webs in response to the air pressure against the undersurface of said cover whereby said first and second webs maintain said cover in a predetermined shape, said first and second webs intersecting one another; and mean for connecting at least two of said intersecting webs one to the other, including a loop extending about each of said two intersecting webs.

17. A system according to claim 16 wherein said loops are connected to said cover.

* * * * *